(12) United States Patent
Watanabe

(10) Patent No.: US 7,763,389 B2
(45) Date of Patent: Jul. 27, 2010

(54) FUEL CELL MANUFACTURING DEVICE AND FUEL CELL

(75) Inventor: Kazuhiro Watanabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 85 days.

(21) Appl. No.: 12/007,771

(22) Filed: Jan. 15, 2008

(65) Prior Publication Data

US 2008/0182137 A1 Jul. 31, 2008

(30) Foreign Application Priority Data

Jan. 25, 2007 (JP) ............................. 2007-015492

(51) Int. Cl.
*H01M 8/02* (2006.01)
(52) U.S. Cl. ................ 429/433; 429/467; 429/468; 429/471; 429/50; 429/61; 429/90; 429/93; 29/729
(58) Field of Classification Search ................ None
See application file for complete search history.

(56) References Cited

FOREIGN PATENT DOCUMENTS

| CA | 2 516 935 A1 | 9/2004 | |
|---|---|---|---|
| JP | 11-097054 A | 4/1999 | |
| JP | 11-097954 A | 4/1999 | |
| JP | 2003-86230 A | 3/2003 | |
| JP | 2005-149849 A | 6/2005 | |
| JP | 2005235408 | * | 9/2005 |
| JP | 2006-92997 A | 4/2006 | |
| JP | 2006-108058 A | 4/2006 | |
| WO | WO 01/56104 A2 | 8/2001 | |

OTHER PUBLICATIONS

JP2006108058—translation.*

* cited by examiner

*Primary Examiner*—Patrick Ryan
*Assistant Examiner*—Ladan Mohaddes
(74) *Attorney, Agent, or Firm*—Kenyon & Kenyon LLP

(57) ABSTRACT

There are disclosed a fuel cell manufacturing device in which a time of an assembling operation of a fuel cell can be reduced, and the fuel cell. A fuel cell manufacturing device is for use in manufacturing a fuel cell having a cell component including a plurality of stacked cells, and a pressurizing component which pressurizes the cell component in a stacking direction, and the device includes a first displacement measurement section which measures a displacement in a case where a defined load is applied to the cell component, and a second displacement measurement section which measures a displacement in a case where a defined load is applied to the pressurizing component. During the assembling operation, a shim for length adjustment having a thickness corresponding to the displacements is selected, and this shim is arranged between the cell component and the pressurizing component.

3 Claims, 2 Drawing Sheets

FUEL CELL MANUFACTURING DEVICE AND FUEL CELL

BACKGROUND OF THE INVENTION

1. Field of the Invention

The present invention relates to a fuel cell and a fuel cell manufacturing device for use in manufacture of the fuel cell.

2. Description of the Related Art

A fuel cell has a structure including, for example, a cell component having stacked cells which are a plurality of minimum power generation units, and a pressurizing component which pressurizes this cell component in a stacking direction. A load adjustment screw is disposed between the pressurizing component and the cell component in order to regulate a load which is applied to the cell component by the pressurizing component.

[Patent Document 1] Japanese Patent Application Laid-Open No. 2006-108058

In the fuel cell having the structure as described above, after the cell component and the pressurizing component are assembled, the load to be applied to the cell component is regulated with the load adjustment screw to end an assembling operation of the fuel cell, but this load adjustment requires much time, and resultantly a time of the whole assembling operation of the fuel cell lengthens.

SUMMARY OF THE INVENTION

Therefore, an object of the present invention is to provide a fuel cell manufacturing device in which a time of an assembling operation of a fuel cell can be reduced, and the fuel cell.

To achieve the above object, the present invention is a fuel cell manufacturing device for use in manufacturing a fuel cell having a cell component including a plurality of stacked cells, and a pressurizing component which pressurizes the cell component in a stacking direction, the device comprising: a first displacement measurement section which measures a displacement in a case where a defined load is applied to the cell component; and a second displacement measurement section which measures a displacement in a case where a defined load is applied to the pressurizing component.

According to such a constitution, the first displacement measurement section can measure the displacement in a case where the defined load is applied to the cell component, and the second displacement measurement section can measure the displacement in a case where the defined load is applied to the pressurizing component. Therefore, when, during the assembling operation, a shim for length adjustment having a thickness corresponding to these displacements is simply selected and arranged between the cell component and the pressurizing component to assemble the fuel cell, a desired load can be applied to the cell component, and a load regulating operation with a load adjustment screw is not required.

In this case, the device may have a selecting section which selects a shim for length adjustment to be inserted between the cell component and the pressurizing component based on a measurement result of the first displacement measurement section and a measurement result of the second displacement measurement section. The measurement result of this second displacement measurement section is, for example, a displacement measurement result in a case where the defined load is applied to the pressurizing component, the load corresponding to a reactive force to be received by the pressurizing component in a case where a predetermined defined load is applied to the cell component by the pressurizing component.

According to such a constitution, since the selecting section automatically selects the shim for length adjustment to be inserted between the cell component and the pressurizing component from the measurement result of the first displacement measurement section and the measurement result of the second displacement measurement section, a selecting operation of the shim for length adjustment is facilitated.

Moreover, the present invention can be provided as a fuel cell having a cell component including a plurality of stacked cells and a pressurizing component which pressurizes the cell component in a stacking direction, the fuel cell further comprising: a shim for length adjustment in the stacking direction which is disposed between the cell component and the pressurizing component.

According to the present invention, during an assembling operation, the selected shim for length adjustment is arranged between the cell component and the pressurizing component to assemble the fuel cell, whereby a desired load can be applied to the cell component. Therefore, a time for the assembling operation of the fuel cell can be reduced.

DESCRIPTION OF THE PREFERRED EMBODIMENTS

Figure 1:
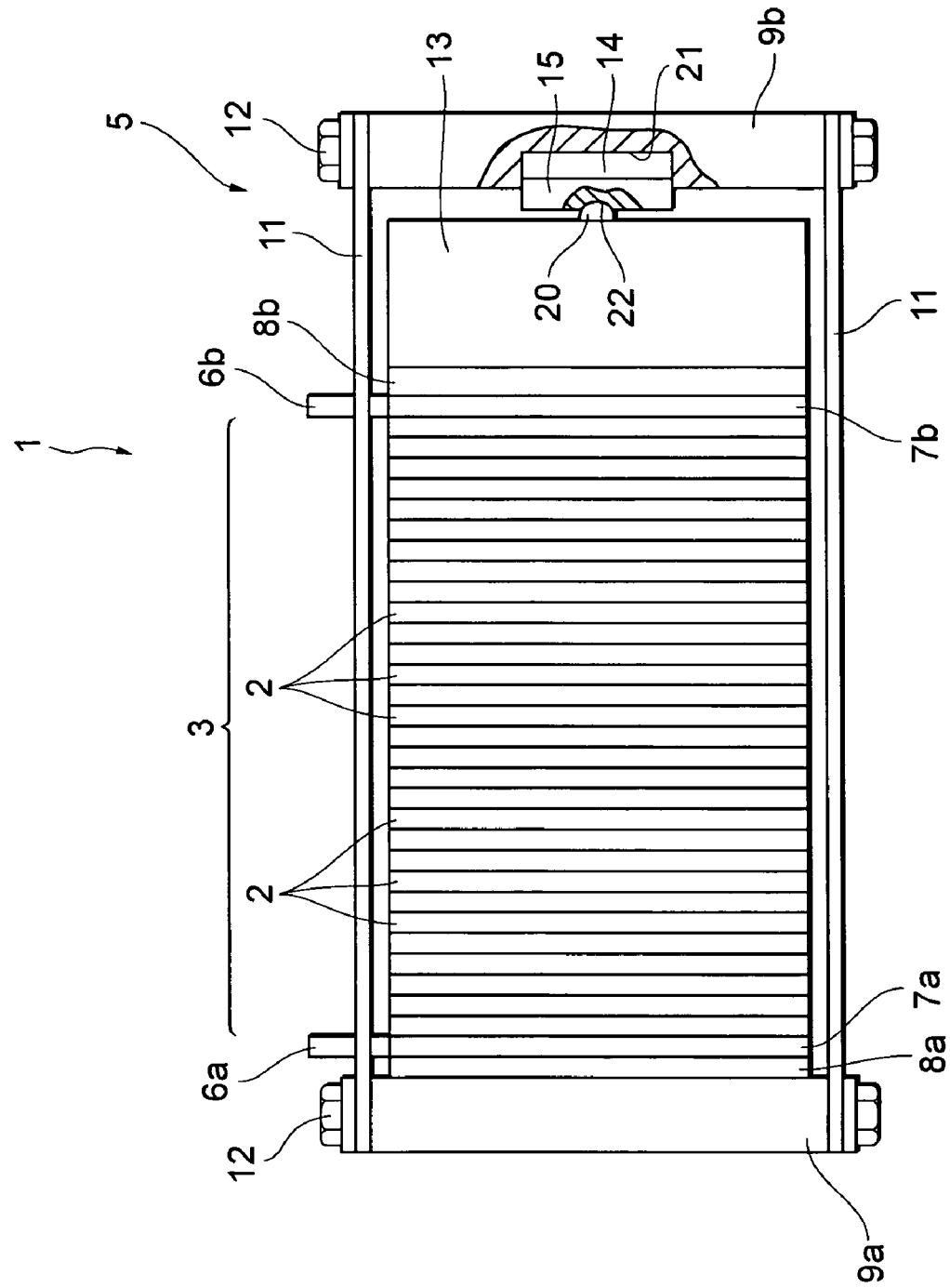
FIG. 1 is a side view partially including a sectional view showing a fuel cell according to one embodiment of the present invention.

One embodiment of a fuel cell manufacturing device and a fuel cell according to the present invention will be described with reference to the drawings.

First, a fuel cell 1 will be described with reference to FIG. 1. The fuel cell 1 includes a cell stacked body 3 in which a plurality of cells 2 as basic units of power generation are stacked, and a frame 5 which supports the cell stacked body 3. A terminal plate 7a is arranged at one end of the cell stacked body 3 in a stacking direction of the cells 2, and an insulating plate 8a is arranged on an outer side of the terminal plate 7a. Furthermore, an end plate 9a constituting the frame 5 is arranged on an outer side of the insulating plate.

Moreover, a terminal plate 7b is arranged at the other end of the cell stacked body 3, an insulating plate 8b is arranged on an outer side of the terminal plate, and a spring box 13 is further arranged on an outer side of the insulating plate. The terminal plates 7a, 7b are provided with output terminals 6a, 6b. On an outer side of the spring box 13, an end plate 9b constituting the frame 5 is arranged, and a shim 14 for length adjustment in the cell stacking direction and an abutment plate 15 are interposed between the spring box 13 and the end plate 9b.

A plurality of tension plates 11 are extended along the stacking direction of the cells 2 between two end plates 9a and 9b arranged on opposite sides of the cell stacked body 3. Opposite end portions of the respective tension plates 11 are fixed to the end plates 9a, 9b by bolts 12, respectively, and the tension plates together with the two end plates 9a, 9b constitute the frame 5.

The spring box 13 is provided with a plurality of coil springs (not shown). When the two end plates 9a, 9b are connected to each other via the plurality of tension plates 11, a compressive force is introduced into these coil springs. In consequence, the spring box 13 urges the insulating plate 8b, that is, the cell stacked body 3 in the stacking direction, and the plurality of cells 2 are fastened with this urging force. A reactive force against the urging force of the spring box 13 is imposed on the tension plates 11, whereby a tensile force is applied to the tension plates 11.

Here, at the center of the spring box 13, a protruding portion 20 which has a spherical shape and which protrudes toward the end plate 9b is formed. The end plate 9b is provided with a recess 21 disposed so as to face this protruding portion 20 and having a predetermined depth. Moreover, the disc-like shim 14 for length adjustment is arranged on the side of a bottom surface of this recess 21, and the abutment plate 15 is arranged on an opening side of the recess. One surface of the abutment plate 15 is provided with a substantially spherical concave portion 22, and the protruding portion 20 is fitted into this concave portion 22 to allow the abutment plate 15 to abut on the spring box 13. This fuel cell 1 is not provided with any screw for load adjustment.

It is to be noted that a plurality of types of shims 14 for length adjustment having different thicknesses are prepared as described later, and the shim having an appropriate thickness is selected from the shims and inserted. Therefore, when all the shims 14 for length adjustment are provided with the concave portions 22, manufacturing costs increase. Therefore, the abutment plate 15 having the concave portion 22 is formed separately from the shim 14 for length adjustment as described above, but the shim 14 for length adjustment itself may be provided with the concave portion 22 to omit the abutment plate 15.

Figure 2:
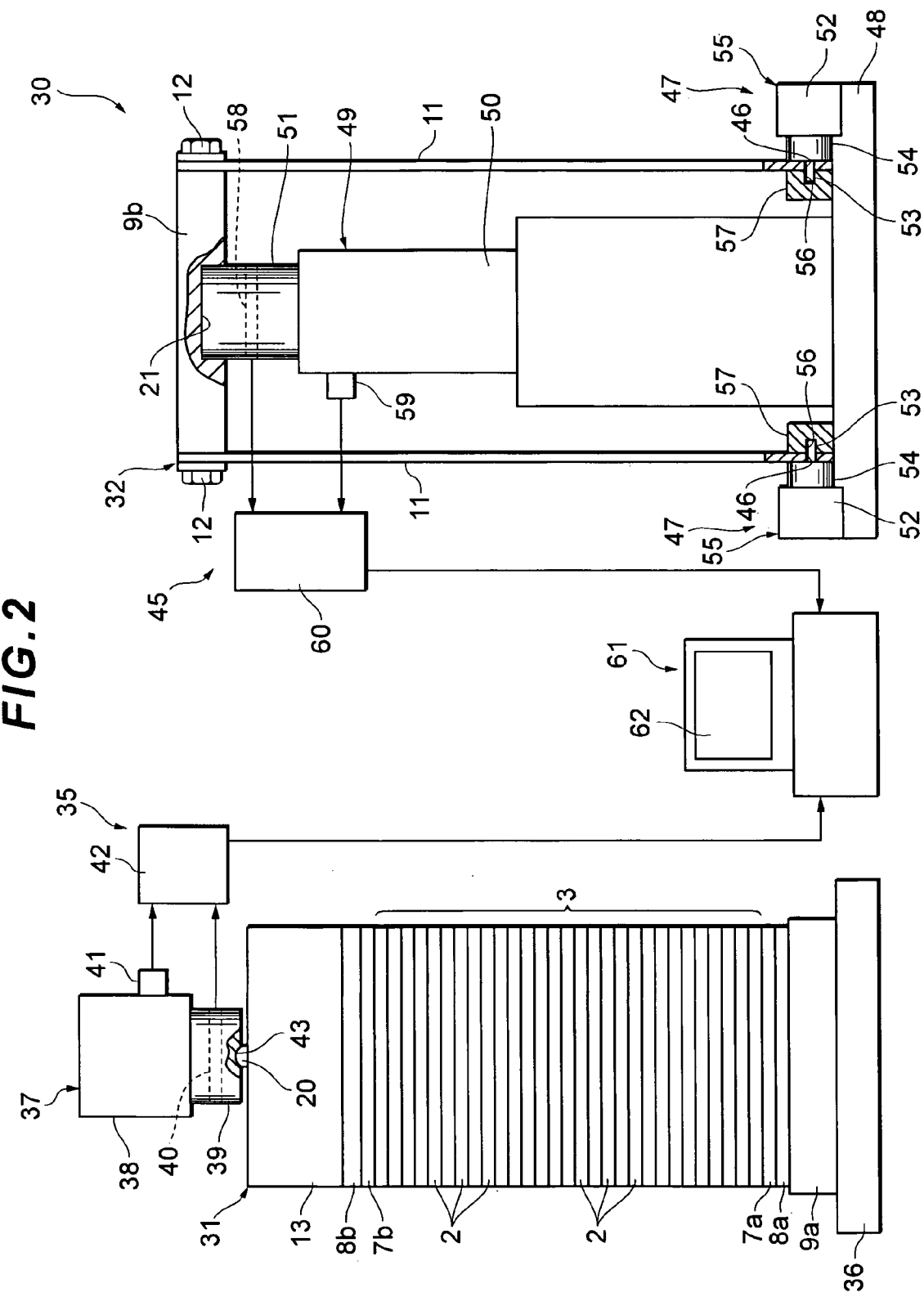
FIG. 2 is a constitution diagram showing a manufacturing device for the fuel cell according to one embodiment of the present invention.

Next, a fuel cell manufacturing device 30 will be described with reference to FIG. 2.

The fuel cell 1 is first assembled until the insulating plate 8a, the terminal plate 7a, the cell stacked body 3, the terminal plate 7b, the insulating plate 8b and the spring box 13 are mounted on the end plate 9a. This assembly constitutes a cell component (a component to be pressurized) 31 including the plurality of stacked cells 2. On the other hand, the plurality of tension plates 11 are fixed to the end plate 9b with the bolts 12. This assembly constitutes a pressurizing component 32 which pressurizes the assembled cell component 31 in the stacking direction.

Moreover, the fuel cell manufacturing device 30 has a first measurement unit (a first displacement measurement section) 35 which measures the cell component 31.

This first measurement unit 35 has a base portion 36 on which the cell component 31 is mounted, and a cylinder 37 which presses downwards the cell component 31 on the base portion 36 from the upside of the cell component. The cylinder 37 includes a cylinder main body 38 fixed at a position above the base portion 36, and a piston 39 which protrudes downwards from the cylinder main body 38 to press the cell component 31.

Moreover, the first measurement unit 35 has a load cell 40 which is disposed at the piston 39 so as to detect a load applied to the cell component 31, a displacement meter 41 which detects a displacement of the piston 39, and a measurement section 42 which measures, from values detected by these components, a displacement in a case where the defined load is applied to the cell component 31. An undersurface of the piston 39 is provided with a concave portion 43 which has the same shape as that of the concave portion 22 of the abutment plate 15 and which is fitted into the protruding portion 20 of the spring box 13 in a case where the cell component 31 is pressurized.

In addition, the fuel cell manufacturing device 30 has a second measurement unit (a second displacement measurement section) 45 which measures the pressurizing component 32.

This second measurement unit 45 has a base portion 48 including clamp units 47 which clamp the tension plates 11 of the pressurizing component 32 by use of attachment holes 46 for attaching the bolts 12, and a cylinder 49 which presses upwards the end plate 9b of the pressurizing component 32 clamped by the clamp units 47 from the downside of the end plate. The cylinder 49 includes a cylinder main body 50 fixed at a position above the base portion 48, and a piston 51 which protrudes upwards from the cylinder main body 50 to press the pressurizing component 32.

This piston 51 enters the recess 21 of the end plate 9b to press the bottom surface of the recess 21. Each of the clamp units 47 has a cylinder 55 including a cylinder main body 52 fixed to the base portion 48 and a piston 54 which protrudes from the cylinder main body 52 to insert a shaft portion 53 into the attachment hole 46, and a receiving portion 57 having an insertion hole 56 into which the shaft portion 53 of the piston 54 is inserted and configured so that the tension plate 11 is nipped between the receiving portions provided with the pistons 54.

Moreover, this second measurement unit 45 has a load cell 58 which is disposed at the piston 51 so as to detect a load applied to the pressurizing component 32, a displacement meter 59 which is disposed at the cylinder main body 50 so as to detect a displacement of the piston 51, and a measurement section 60 which measures, from values detected by these components, a displacement in a case where a defined load is applied to the pressurizing component 32.

Furthermore, the fuel cell manufacturing device 30 has a selection unit (a selecting section) 61 which automatically selects the shim 14 for length adjustment to be inserted between the cell component 31 and the pressurizing component 32 as shown in FIG. 1 based on the displacement in a case where the defined load is applied to the cell component 31 as a measurement result of the measurement section 42 of the first measurement unit 35 and the displacement in a case where the defined load is applied to the pressurizing component 32 as a measurement result of the measurement section 60 of the second measurement unit 45, thereby displaying the shim in a display section 62.

That is, in the first measurement unit 35, a distance from the base portion 36 to the cylinder 37 is defined. In this first measurement unit 35, a height position of the protruding portion 20 of the cell component 31 in a case where this defined load is applied can be obtained from the displacement of the piston 39 in a case where the defined load is applied to the cell component 31. Similarly, in the second measurement unit 45, a distance from the base portion 48 to the cylinder 49 is defined. In this second measurement unit 45, a height position of the bottom surface of the recess 21 of the pressurizing component 32 in a case where this defined load is applied can be obtained from the displacement of the piston 51 in a case where the defined load is applied to the pressurizing component 32.

From these values, a thickness of the shim 14 for length adjustment required in a case where the cell component 31 and the pressurizing component 32 are assembled to generate the defined load in these components can be obtained. Moreover, a matrix table to automatically select an optimum thickness of the shim 14 for length adjustment is experimentally obtained beforehand from the measurement result obtained by the measurement section 42 of the first measurement unit 35 and the measurement result obtained by the measurement section 60 of the second measurement unit 45, and this matrix table is stored in the selection unit 61.

Moreover, with respect to the cell component 31 and the pressurizing component 32 constituting the same fuel cell 1, an operator measures the displacement in a case where the defined load is applied to the cell component 31 with the first measurement unit 35 as described above, and measures the displacement in a case where the defined load is applied to the pressurizing component 32 with the second measurement unit 45 as described above. Then, these measurement results are output from the measurement sections 42 and 60 to the selection unit 61, and the selection unit 61 automatically selects the thickness of the shim 14 for length adjustment from these measurement results based on the incorporated matrix table to display the thickness in the display section 62.

In this case, during an assembling operation, the operator takes the shim 14 for length adjustment having the displayed thickness from the plurality of types of prepared shims 14 for length adjustment having different thicknesses, and interposes this shim 14 for length adjustment and the abutment plate 15 between the pressurizing component 32 and the cell component 31 to assemble the components. In consequence, when the fuel cell 1 is simply assembled in this manner, a desired load can be applied to the cell component 31, and a load adjustment operation with a load adjustment screw is not required. Therefore, a time of the assembling operation of the fuel cell 1 can be reduced.

It is to be noted that the first measurement unit 35 may not be separated from the second measurement unit 45 in assembling the cell component 31 and pressurizing component 32. At this time, one measurement unit may be used which enters an arrangement space of the shim 14 for length adjustment to measure a length of the arrangement space. In this case, after the length is measured, the cell component 31 and the pressurizing component 32 are disassembled, and the shim 14 for length adjustment selected based on a measurement result of the measurement unit is interposed between the components to assemble the components again.

Moreover, as the displacement meters 41, 59, various length measurement systems such as a proximity system, a potential system and a laser system may be applied.

Furthermore, as the cylinders 37, 49, various pressurizing systems such as a hydraulic system, a pneumatic system and a mechanical system may be applied.

In addition, when the fuel cell 1 is divided into the cell component 31 and the pressurizing component 32, instead of dividing the end plate 9a and the tension plates 11 at a connecting position, the tension plates 11 may be divided at an optimum position, for example, at the center of the center of the plate, in accordance with a shape of the fuel cell 1 or the like.

Moreover, optimum shapes and structures of the respective sections of the first measurement unit 35 and the second measurement unit 45, an optimum clamp system, an optimum assembling method of the fuel cell 1 after the selection of the shim for length adjustment and the like may be selected in accordance with the shape of the fuel cell 1 or the like.

In addition, the present invention may be applied to the fuel cell 1 of such a type that the end plates 9a, 9b are connected to each other via a bolt instead of the tension plates 11.

What is claimed is:

1. A device for use in the manufacture of a fuel cell having a cell component including a plurality of stacked cells, and a pressurizing component which pressurizes the cell component in a stacking direction, and the cell component and the pressurizing component are assembled to generate a defined load in these components, the device comprising:
    a first displacement measurement section which measures a displacement in a case where said defined load is applied to the cell component; and
    a second displacement measurement section which measures a displacement in a case
    where said defined load is applied to the pressurizing component.

2. The device according to claim 1, which further comprises:
    a selecting section to select a shim for length adjustment to be inserted between the cell component and the pressurizing component based on a measurement result of the first displacement measurement section and a measurement result of the second displacement measurement section.

3. The device according to claim 2, wherein the measurement result of the second displacement measurement section is a displacement of the pressurizing component when the defined load is applied to the pressurizing component, the defined load corresponds to a reactive force to be received by the pressurizing component when a predetermined defined load is applied to the cell component by the pressurizing component.

* * * * *